United States Patent
Qi

(10) Patent No.: US 9,689,297 B2
(45) Date of Patent: Jun. 27, 2017

(54) EXHAUST-GAS AFTERTREATMENT SYSTEM WITH VENTURI EXHAUST PASSAGE DEVICES

(71) Applicant: Baohua Qi, Marietta, GA (US)

(72) Inventor: Baohua Qi, Marietta, GA (US)

( * ) Notice: Subject to any disclaimer, the term of this patent is extended or adjusted under 35 U.S.C. 154(b) by 85 days.

(21) Appl. No.: 14/730,281

(22) Filed: Jun. 4, 2015

(65) Prior Publication Data

US 2015/0361860 A1 Dec. 17, 2015

Related U.S. Application Data

(60) Provisional application No. 62/011,734, filed on Jun. 13, 2014.

(51) Int. Cl.

| F01N 11/00 | (2006.01) |
|---|---|
| F01N 9/00 | (2006.01) |
| F01N 3/025 | (2006.01) |
| F01N 3/20 | (2006.01) |
| F01N 3/027 | (2006.01) |

(52) U.S. Cl.
CPC .......... F01N 11/002 (2013.01); F01N 3/027 (2013.01); F01N 3/0253 (2013.01); F01N 3/2053 (2013.01); F01N 9/002 (2013.01); *F01N 2410/04* (2013.01); *Y02T 10/24* (2013.01); *Y02T 10/47* (2013.01)

(58) Field of Classification Search
CPC ...... F01N 11/002; F01N 3/0253; F01N 3/027; F01N 3/2053; F01N 9/002; F01N 2410/04; F01N 2610/02; Y02T 10/47; Y02T 10/24
See application file for complete search history.

(56) References Cited

U.S. PATENT DOCUMENTS

| 8,096,125 B2* | 1/2012 | Hepburn | F01N 3/021 123/568.12 |
|---|---|---|---|
| 8,479,501 B2* | 7/2013 | McCarthy, Jr. | F01N 3/0814 60/295 |
| 8,903,632 B2* | 12/2014 | Peters | F02D 41/0082 123/568.12 |
| 9,021,787 B2* | 5/2015 | Yan | F01N 11/00 60/276 |
| 9,291,079 B2* | 3/2016 | Yan | F01N 3/0253 |
| 2015/0176462 A1* | 6/2015 | Qi | F01N 3/2066 60/303 |

* cited by examiner

*Primary Examiner* — Michael Zarroli

(57) ABSTRACT

A Diesel Particulate Filter (DPF) system including a Venturi exhaust passage device, in which a temperature and a pressure in a high pressure passage are measured, together with a difference of pressures in the high pressure passage and a low pressure passage, while a pressure drop across a DPF is monitored. A PM amount and an exhaust flow rate, which are key parameters in DPF control, can be calculated with the measured values. With the Venturi exhaust passage device, a two-stage bootstrapping heating device with two DOCs and an electrical heater can be further used to heat exhaust gas at a temperature lower than a light-off temperature, while a flow-back passage fluidly connected to an outlet of the DPF can be used for increasing exhaust flow-rate and making PM distribution in the DPF more uniform.

11 Claims, 8 Drawing Sheets

EXHAUST-GAS AFTERTREATMENT SYSTEM WITH VENTURI EXHAUST PASSAGE DEVICES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD OF THE INVENTION

This present application claims priority from U.S. provisional application No. 62/011,734 having the same title as the present invention and filed on Jun. 13, 2014.

This invention relates to an apparatus and method for controlling an exhaust gas processing system for removing particulate matters emitted from an internal combustion engine, more specifically, to an apparatus and method for controlling regenerations of DPFs (Diesel Particulate Filters) in an exhaust gas processing system of an internal combustion engine.

BACKGROUND OF THE INVENTION

Environmentally harmful species in exhaust gas emitted from an internal combustion engine, such as hydrocarbons (HC), carbon monoxide (CO), particulate matters (PM), and nitric oxides (NOx) are regulated species that need to be removed. In lean combustion engines, e.g. diesel engines, due to their lean combustion nature, PM and NOx are two major emissions. To remove these harmful species, a variety of technologies have being used. Among them, DPF technology is effective in decreasing PM, including both particle mass and numbers, while a number of technologies, including LNT (Lean NOx Trap) and SCR (Selective Catalytic Reduction) are used for reducing NOx emissions.

In a DPF, trapped PM accumulates and increases engine back pressure. To avoid excessively high engine back pressure, the trapped PM in the filter needs to be controlled lower than certain amount. A process for reducing PM is also called a regeneration process. A DPF regeneration can be performed either continuously, during normal operations of the filter, or periodically, after a pre-determined amount of PM has been accumulated. Typically to ensure that a DPF can be reliably regenerated, periodical regenerations are required. And to effectively remove accumulated PM, exhaust temperature needs to be elevated to a certain level, for example, to effectively oxidize PM with oxygen, typically exhaust temperature needs to be controlled above 500° C.

A variety of devices, including electrical heaters, DOCs (Diesel Oxidation Catalysts), and fuel burners, can be used in heating exhaust gas in a DPF regeneration process. And to control exhaust gas temperature to a pre-determined level, the power applied to the devices, e.g. electrical current for electrical heaters, fueling rate for fuel burners, and fuel dosing rate for DOCs, needs to be controlled by an ECU (Engine Control Unit) in response to a few control parameters, such as exhaust gas flow rate, which is normally calculated with engine operating parameters, DOC temperature, and DPF temperature. These control parameters, together with a pressure drop across a DPF, which can be measured with a differential pressure sensor, are also used in estimating PM loading in the DPF, and the PM loading amount value can be further used in triggering DPF regenerations.

In the control parameters, normally the engine operating parameter values are obtained from engine controls. However, the engine operating parameters are not always available, and in some systems, even though the engine operating parameters are available, their applications are limited due to the limits of the system structure. For example, in applications with mechanically controlled engines, e.g. in a vehicle retrofit, ECU and the engine operating parameters are not available since engine fueling is controlled mechanically. In engine systems with multiple exhaust branches, e.g. in a high horse power engine system, even the overall exhaust flow rate can be estimated with the engine fueling rate and engine speed, exhaust flow rate in each branch is not available. In these applications, to control DPF regenerations, either more sensors, such as engine speed sensors and throttle position sensors, are installed in the engine system for obtaining the engine operating parameters, or more assumptions are used in estimation, e.g., assuming exhaust flow is equally distributed in each exhaust branch. Installing new sensors in an engine system changes system structure, causing reliability issues, while more assumptions deteriorate control performance and diagnosis capabilities. Moreover, when sensors are installed in the engine system, different engine types and applications require different sensor types, resulting in high system cost and engineering cost.

When a DOC is used in heating exhaust gas, due to the limit of its light-off temperature, when exhaust gas temperature is low, fuel dosing has to be disabled, since unburnt fuel leaks through the DOC and DPF, creating an emission by itself. As a result, under certain operating conditions, such as when an engine is idling or when a vehicle frequently stops and goes (e.g. a city bus), low exhaust temperature stops DPF regenerations, causing high PM load in the DPF and un-uniform distribution or mal-distribution of PM, which are major causes of thermal runaways damaging the DPF.

In a DPF regeneration process, when exhaust flow rate is low, due to the low thermal energy the exhaust flow carries, a DPF could be locally heated, resulting in un-uniform PM distribution in the DPF. To prevent the PM un-uniform distribution caused by low exhaust flow rate, normally in addition to a temperature threshold, a flow threshold is also applied for disabling heating the DPF. However, as that mentioned above, the flow threshold may delay or interrupt a DPF regeneration when an engine runs into low exhaust flow modes, resulting in high PM accumulation and un-uniform PM distribution, which increase the risk of thermal runaways. Additionally, when exhaust flow rate decreases significantly in a short period of time, e.g. when an engine drops to idle, less heat is carried away by the exhaust flow. In a DPF regeneration, when the exhaust flow rate drops too low, even fuel dosing is disabled, a temperature spike could still be created in the DPF, igniting loaded PM and causing a thermal runaway if there is a high PM accumulation or a PM mal-distribution.

To solve the problems mentioned above, it is then a primary object of the present invention to provide an apparatus to obtain key parameter values in DPF regeneration control without using engine operating parameters, so that the DPF system is able to work when these parameters are not available.

A further object of the present invention is to provide an apparatus to regenerate a DPF with low temperature exhaust gas flow, so that more chances can be obtained for regenerating the DPF.

Another object of the present invention is to provide an apparatus to increase exhaust gas flow rate when an engine operates at low exhaust flow mode, so that DPF regenerations need not to be interrupted at these operating modes.

BRIEF SUMMARY OF THE INVENTION

The present invention provides an apparatus for controlling regenerations of DPFs in an exhaust gas processing system of an internal combustion engine system. This apparatus includes a Venturi exhaust passage device which has an upstream high pressure passage, a low pressure passage, and a downstream high pressure passage. In one embodiment of the present invention, the downstream high pressure passage is fluidly connected to a heating device, which is positioned upstream from a DPF. A pressure sensor and a temperature sensor are used to measure a pressure and a temperature in the downstream high pressure passage respectively, while a first differential pressure sensor is employed to measure a difference between pressures in the downstream high pressure passage and the low pressure passage. An exhaust flow rate, which is a key parameter in controlling DPF regenerations, is calculated by a regeneration controller according to sensing values obtained from the temperature sensor, the first differential pressure sensor, and the pressure sensor. A second differential pressure sensor is used to measure a pressure drop across the DPF, and a PM amount value, which can be used for triggering a DPF regeneration process, is calculated according to a ratio between sensing values obtained from the second differential pressure sensor and the first differential pressure sensor.

In another embodiment of the present invention, the upstream high pressure exhaust passage is in communication to a fuel injector, and an electrical heater is fluidly connected to the upstream high pressure exhaust passage. A front DOC positioned downstream from the electrical heater is fluidly connected to the low pressure exhaust passage, and a main DOC positioned downstream from the DPF is fluidly connected to the downstream high pressure exhaust passage. When exhaust gas temperature is low, after a DPF regeneration process starts, dosing fuel is released through the fuel injector at a bootstrapping dosing rate and the electrical heater is energized. The dosing fuel together with the exhaust gas passing through the electrical heater is heated above a light-off temperature of the front DOC, where the dosing fuel is oxidized and the exhaust gas and the front DOC is exothermically heated. The heated exhaust gas then enters the main DOC and heats it. When a bed temperature of the main DOC is higher than its light-off temperature, then the electrical heater is de-energized and a normal dosing rate is generated. There is a bootstrapping process in the heating control, since when the DOCs are exothermically heated, the DOC temperatures get higher, and so is the HC conversion efficiency. Higher HC efficiency cause more HC oxidized and more heat is released in the oxidation reactions, resulting in higher DOC temperature. When the heat released by oxidizing dosing fuel is able to sustain the bed temperature of the main DOC, the electrical heating is no longer required, and since only a fraction of exhaust gas passes through the electrical heater, electrical energy required in the heating control is significantly decreased.

In another embodiment of the present invention, a flow-back passage fluidly connects an outlet of the DPF to the low pressure exhaust passage. Through the flow-back passage, a higher exhaust flow rate through the DPF can be obtained, which lowers un-uniform distribution of PM, especially during a DPF regeneration, since more exhaust heat energy is carried by the exhaust flow. The high exhaust flow rate also decreases resident time of dosing fuel in the heating device if it is positioned downstream from the downstream high pressure passage. Short resident time lowers response time of the heating device and improves temperature control performance. However, it also lowers HC conversion efficiency. To avoid low HC conversion efficiency, a control valve can be used to control air flow in the feedback flow passage, and exhaust gas is only allowed to pass through the flow-back passage when a low exhaust flow rate is generated by the engine.

In another embodiment of the present invention, a DPF system is provided with a combination of technologies disclosed in the above embodiments of the present invention. With the calculated exhaust flow rate and PM amount values, DPF regenerations can be triggered and controlled without having engine operating parameters, while a bootstrapping process can be used in heating control when exhaust gas temperature is low. Through the flow-back passage, exhaust flow rate through the DPF is increased, thereby PM distribution in the DPF is more uniform at low exhaust flow rates, and the risk of thermal runaways is decreased. Such a system can be used for applications with low exhaust flow rate and low exhaust gas temperature, e.g. in vehicles that frequently stop and go, and retrofit applications in which engine operating parameters are not available.

DETAILED DESCRIPTION OF THE INVENTION

Figure 1:
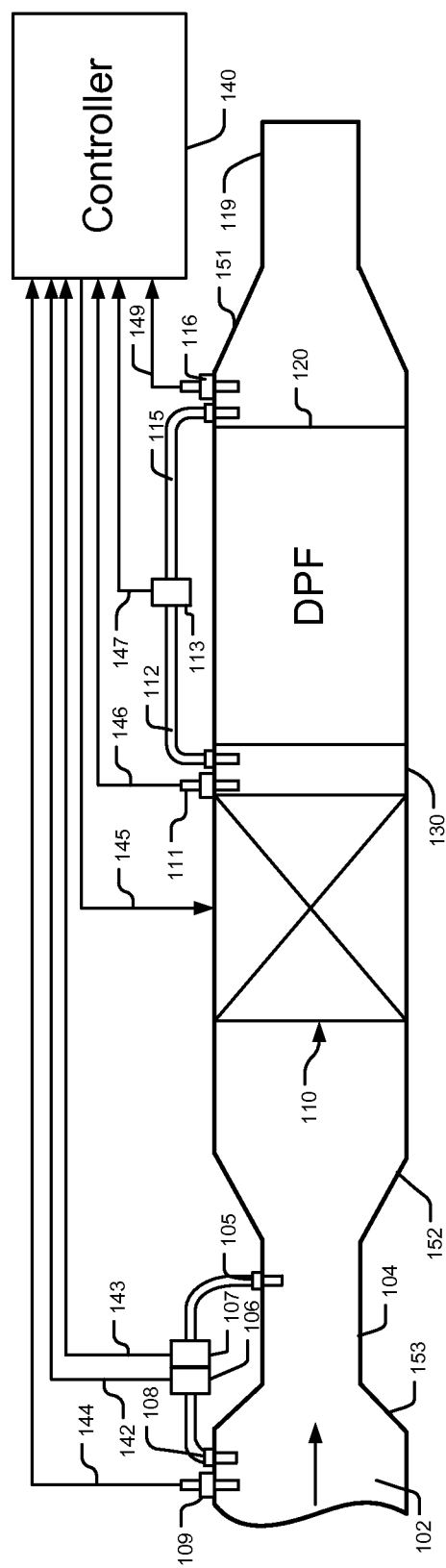
FIG. 1 is a schematic representation of an exhaust gas processing system of an internal combustion engine including an exhaust gas passage device, a heating device and a diesel particulate filter.

Referring to FIG. 1, an exhaust passage 102 is fluidly connected to an exhaust passage 104 with a smaller diameter through a cone transition 153. The exhaust passage 104 is fluidly connected to a DPF package 130 through a cone transition 152. Inside the DPF package 130, a heating device 110 is positioned upstream from a DPF 120. On the exhaust passage 102, through a probe 108, a pressure sensor 106, which communicates to a controller 140 through signal lines 142, is used to detect an exhaust gas pressure in the exhaust passage 102, and a differential pressure sensor 107, which is electrically connected to the controller 140 via signal lines 143, is used for measuring a difference between the pressure in the exhaust pipe 102 and that in the exhaust passage 104 through a probe 105 and the probe 108. The exhaust temperature in the exhaust passage 102, in between the heating device 110 and the DPF 120, and downstream from the DPF 120, are sensed, respectively, by temperature sensors 109, 111, and 116. The temperature sensor 109 communicates with the controller 140 through signal lines 144, while the temperature sensor 111 is electrically connected to the controller 140 through signal lines 146. The heating device 110 is controlled by the controller 140 via signal lines 145, and the temperature sensor 116 communicates with the controller 140 through signal lines 149. The pressure drop across the DPF 120 is detected by a differential pressure sensor 113 communicating with the controller 140 via signal lines 147, while the differential pressure sensor 113 is fluidly connected to the DPF package 130 in between the heating device 110 and the DPF 120 through a probe 112, and fluidly connected to the DPF package 130 downstream from the DPF 120 through a probe 115. The DPF package 130 is fluidly connected to a tailpipe 119 through a transition 151.

In the system of FIG. 1, the exhaust passage 104 and the cone transitions 153 and 152 form a Venturi structure, thereby, the volume matric flow rate Q of an exhaust air flow passing through the heating device 110 and the DPF can be detected using a differential pressure value $\Delta P_2$ obtained from the differential pressure sensor 107, a pressure value $P_{106}$ obtained from the pressure sensor 106, and a temperature value $T_{109}$ provided by the temperature sensor 109, according to the following equation:

$$Q = K_Q \sqrt{\frac{\Delta P_2 T_{109}}{P_{106}}}, \quad (1)$$

where $K_Q$ is a constant and can be calculated using the following equation $$K_Q = \frac{\sqrt{2R}\, C_d A_1 A_2}{\sqrt{A_1^2 - A_2^2}}, \quad (2)$$

where R is the specific gas constant; $C_d$ is the discharge coefficient; $A_1$ is the cross section area of the exhaust passage 102, and $A_2$ is the cross section area of the exhaust passage 104. And the mass flow rate $m_f$ of the exhaust flow can be calculated using the following equation:

$$m_f = K_m \sqrt{\frac{\Delta P_2 P_{106}}{T_{109}}}, \quad (3)$$

where $K_m$ is a constant and can be calculated using the equation:

$$K_m = \frac{\sqrt{2}\, C_d A_1 A_2}{\sqrt{R(A_1^2 - A_2^2)}}. \quad (4)$$

In addition to exhaust gas flow rate, sensing values obtained from the sensors 106, 107, 109, and 113 can be further used for detecting PM load in the DPF 120. With a differential pressure sensing value $\Delta P_1$ obtained from the differential pressure sensor 113, at steady states, we have a relationship described with the following equations:

$$\frac{\Delta P_1}{\Delta P_2} = f(w_p)Y + C_0, \quad (5)$$

and $$Y = \frac{K_2 T_{109}^2}{(T_{109} + C_{exh})\sqrt{\Delta P_2 P_{106}}}, \quad (6)$$

where $f(w_p)$ is a function of a particulate layer thickness $w_p$; $C_{exh}$ is the Sutherland's constant for exhaust gas, and $C_0$ is a constant determined by the DPF volume $V_{trap}$, the $K_Q$ value and a constant pressure drop coefficient $\xi$:

$$C_0 = \frac{\xi K_Q^2}{V_{trap}^2}; \quad (7)$$

$K_2$ is a constant, and $$K_2 = \lambda K_Q \sqrt{R} \quad (8),$$

wherein $\lambda$ is a constant determined by the Sutherland's constant. The function $f(w_p)$ can be a linear function:

$$f(w_p) = C_1 + C_2 w_p \quad (9),$$

where $C_1$ and $C_2$ are constants. In applications where a PM mass load $m_p$ is used for triggering regeneration processes, the PM mass load can be approximated linearly with the function $f(w_p)$:

$$m_p = C_3 + C_4 f(w_p) \quad (10),$$

where $C_3$ and $C_4$ are constants.

Figure 2:
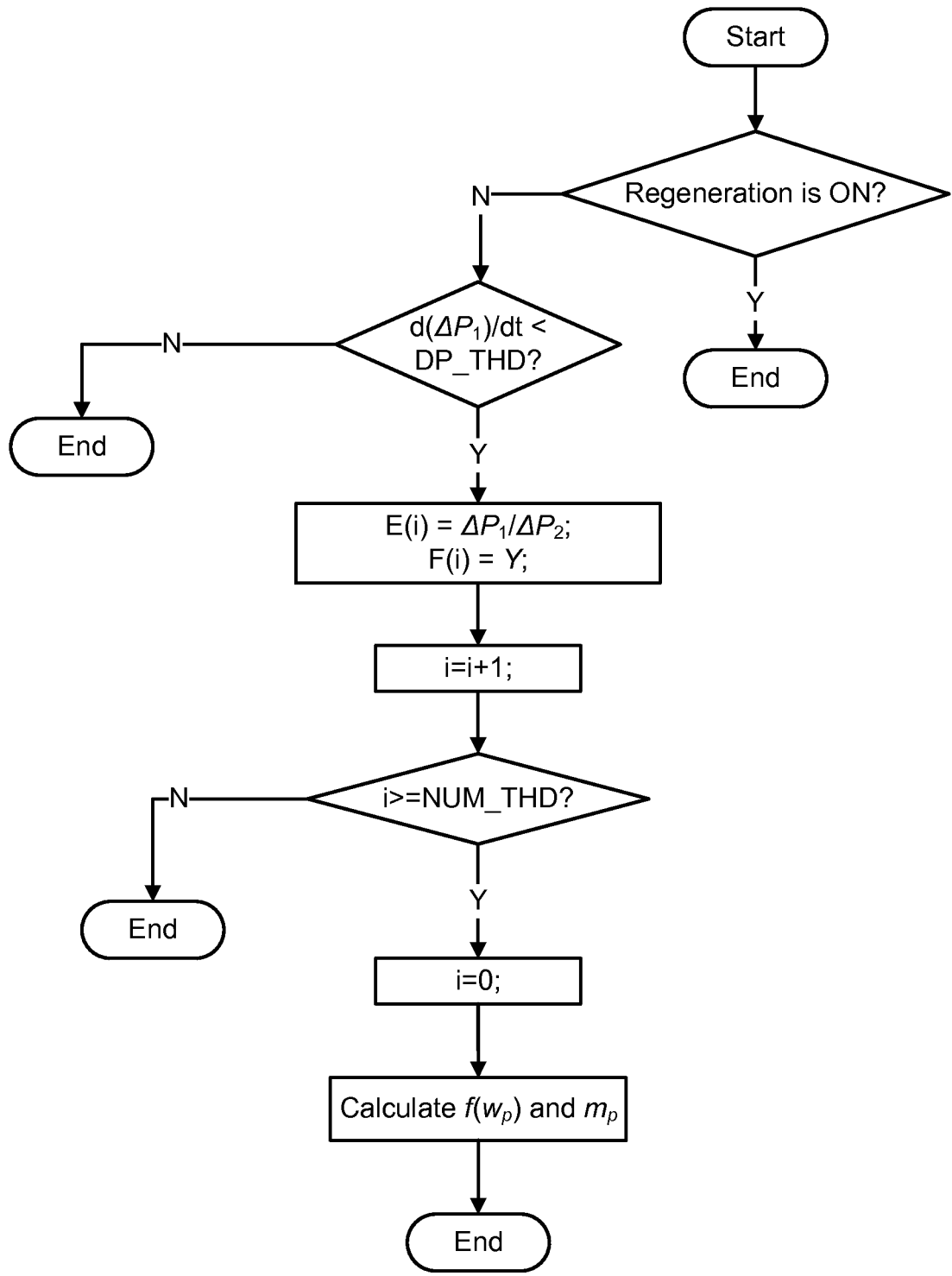
FIG. 2 is a flow chart of a service routine running periodically for a timer based interrupt for calculating an amount of PM deposited in a diesel particulate filter.

In the controller 140, the PM mass load $m_p$ can be calculated with a service routine running periodically for a timer based interrupt, as shown in FIG. 2. In the routine, a regeneration status is firstly checked. If the system is in a regeneration process, then the routine ends. Otherwise, a changing rate of the $\Delta P_1$ value, $d(\Delta P_1)/dt$, is compared with a threshold DP_THD. If it is higher than or equal to the threshold, i.e., the differential pressure sensor 113 is in transient, the routine ends, otherwise, the Y value and $$\frac{\Delta P_1}{\Delta P_2}$$

value are calculated according to equations (6) and (5), and are assigned to the i-th element of vectors F and E, F(i) and E(i), respectively. The i value is then incremented and compared to a threshold NUM_THD. The routine ends if it is lower than the threshold, otherwise, the i value is reset to 0 and $f(w_p)$ and $m_p$ values are calculated with the vectors E and F, and the routine ends thereafter. In the routine, the exclusion of transient values eliminates effects of mismatch of sensing values to the calculation of Y and $$\frac{\Delta P_1}{\Delta P_2}$$

values caused by difference in sensor response time. And a variety of methods, including least squares methods, can be used in calculating the $f(w_p)$ and $m_p$ values.

Figure 3:
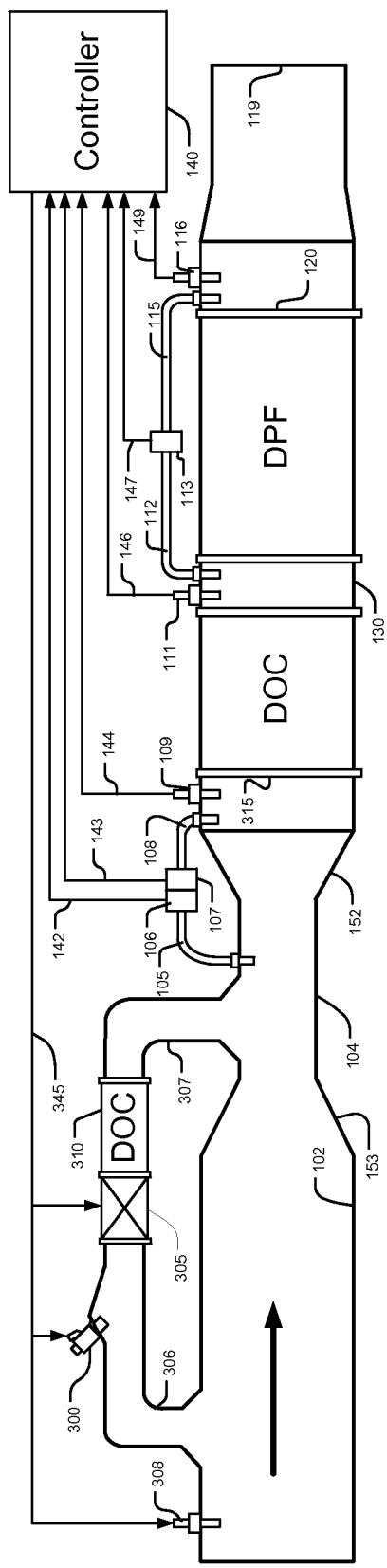
FIG. 3 is a schematic representation of an exhaust gas processing system of an internal combustion engine including an exhaust gas passage device, a two-stage bootstrapping heating device and a diesel particulate filter.

In the system of FIG. 1, the heating device 110 is used for heating exhaust gas in regenerating the DPF 120. A variety of heating elements, including electrical heaters, fuel burners, and DOCs can be used in the heating device 110. With the help of the Venturi structure formed by the exhaust passage 104 and the cone transitions 153 and 152, a two-stage bootstrapping heating device can be used in regenerating the DPF 120 with low temperature exhaust gas. Referring to FIG. 3, in such as system, a heating device for regenerating the DPF 120 includes a temperature sensor 308, a fuel injector 300, an electrical heater 305, a front DOC 310 and a main DOC 315. The temperature sensor 308, the fuel injector 300 and the electrical heater 305 are in communication with the controller 140 through signal lines 345. And the fuel injector 300 is mounted on a connection pipe 306 fluidly connected to the exhaust passage 102 and the electrical heater 305. Upstream from the fuel injector 300, the temperature sensor 308 is positioned on the exhaust passage 102, while the front DOC 310 is positioned downstream from the electrical heater 305. A connection pipe 307 fluidly connects the front DOC 310 to the exhaust passage 104, and downstream from it, the main DOC 315 is positioned in between the temperature sensors 109 and 111.

In the system of FIG. 3, after a DPF regeneration process starts, when exhaust gas temperature is low, the electrical heater 305 is energized on, and a bootstrapping dosing rate is generated through the injector 300. Through the electrical heater 305, the exhaust gas and dosing fuel are heated to a temperature higher than the light-temperature of the front DOC 310, where the dosing fuel is oxidized and the DOC and the exhaust gas are exothermically heated. The heated exhaust gas passes through the connection pipe 307 and mixes with the exhaust gas in the pipe 104. And the result exhaust gas then enters the main DOC 315 and heats it. When the bed temperature in the DOC 315 is higher than its light-off temperature, a normal dosing rate is generated through the injector 300, and the electrical heater 305 is de-energized off. The bootstrapping process then completes. In the bootstrapping process, the bootstrapping dosing rate is lower than the normal dosing rate, and dosing fuel can be fully oxidized in the front DOC 310, while after the bootstrapping process completes, not all dosing fuel can be burned in the front DOC 310, and the unburnt fuel is further oxidized in the main DOC 315 and the DPF 120. The exhaust flow rate through the electrical heater 305 is only a fraction of that in the exhaust passage 102. Therefore, electrical energy needed in heating the exhaust gas is significantly decreased.

Figure 4A:
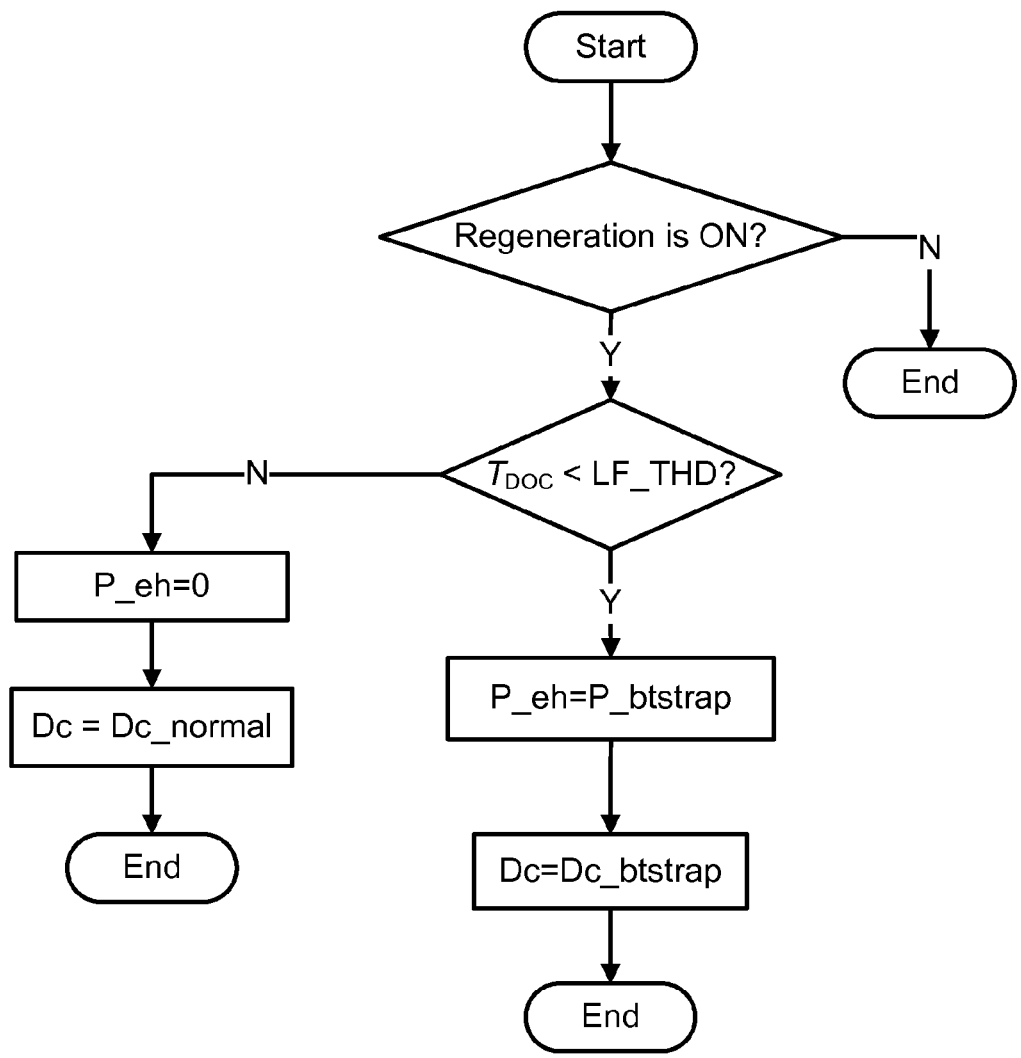
FIG. 4a is a flow chart of a service routine running periodically for a timer based interrupt for generating dosing fuel commands in regenerating a diesel particulate filter in a system of FIG. 3.

The control of the bootstrapping process can be realized with a service routine running periodically for a timer based interrupt. Referring to FIG. 4a, in such a routine, a regeneration status is examined first. The routine ends if the system is not in a regeneration process. Otherwise, a bed temperature of the main DOC 315, $T_{DOC}$, is compared to a threshold LF_THD. If it is lower than the threshold, then a power value P_btstrap is set to a variable P_eh, which is used to control the power applied on the electrical heater 305, and a fuel dosing rate Dc_btstrap is set to a variable Dc controlling the fuel dosing rate through the injector 300. The routine ends thereafter. If the $T_{DOC}$ value is not lower than the threshold LF_THD, then the routine ends after the variable P_eh is set to zero, and the variable Dc is set to a normal dosing value of Dc_normal.

In the routine of FIG. 4a, the $T_{DOC}$ can be calculated using a linear combination of temperature sensing values $T_{109}$ and $T_{111}$ obtained from the temperature sensors 109 and 111 respectively:

$$T_{DOC}=W_1*T_{109}+W_2*T_{111} \qquad (11),$$

where $W_1$ and $W_2$ are constants. And the P_btstrap value can be calculated using a function of the calculated exhaust mass flow rate $m_f$ and a sensing value $T_{308}$ obtained from the temperature sensor 308:

$$P\_btstrap=g(m_f,T_{308}) \qquad (12),$$

where g( ) is a function that can be realized with a lookup table with inputs of the $m_f$ and $T_{308}$ values. The bootstrapping dosing rate can also be determined by the temperature $T_{308}$ and the calculated exhaust mass flow rate $m_f$:

$$Dc\_btstrap=h(m_f,T_{308}),$$

where h( ) is also a function that can be realized with a lookup table. Both of the lookup tables for calculating the P_btstrap and Dc_btstrap values can be populated with experimental results obtained with different exhaust temperatures and flow rates.

Figure 4B:
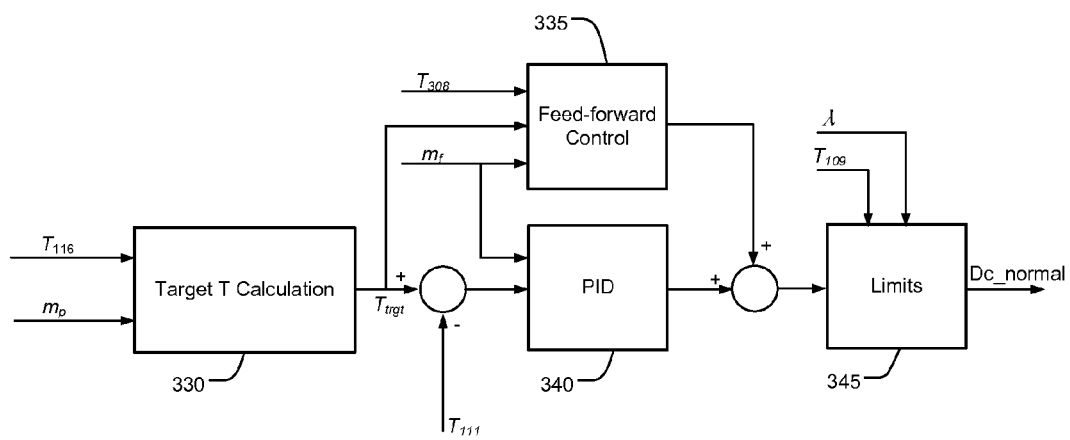
FIG. 4b shows a block diagram of a feedback control in controlling dosing fuel flow-rate in regenerating a diesel particulate filter.

In calculating the normal dosing rate Dc_normal, a PID control can be used with a temperature sensing value $T_{111}$ obtained from the temperature sensor 111 in its feedback loop. An exemplary control scheme is depicted in FIG. 4b. In this control, a target temperature value $T_{trgt}$ is calculated in a block 330 with a temperature sensing value $T_{116}$ obtained from the temperature sensor 116 and the calculated particulate load value $m_p$. Then a control error value is calculated by subtracting the $T_{trgt}$ value with the $T_{111}$ value, and the $T_{trgt}$ value is further used in a block 335 for calculating a feed-forward control value together with the $T_{308}$ value and the $m_f$ value. The control error value together with the $m_f$ value is used in a PID control block 340 for calculating a feedback control value, which is then added to the feed-forward control value, and the result value is passed through a limit block 345, where the normal dosing rate Dc_normal is generated after dosing rate limits being applied with the $T_{109}$ value and an air-to-fuel ratio value λ in engine control.

Figure 5A:
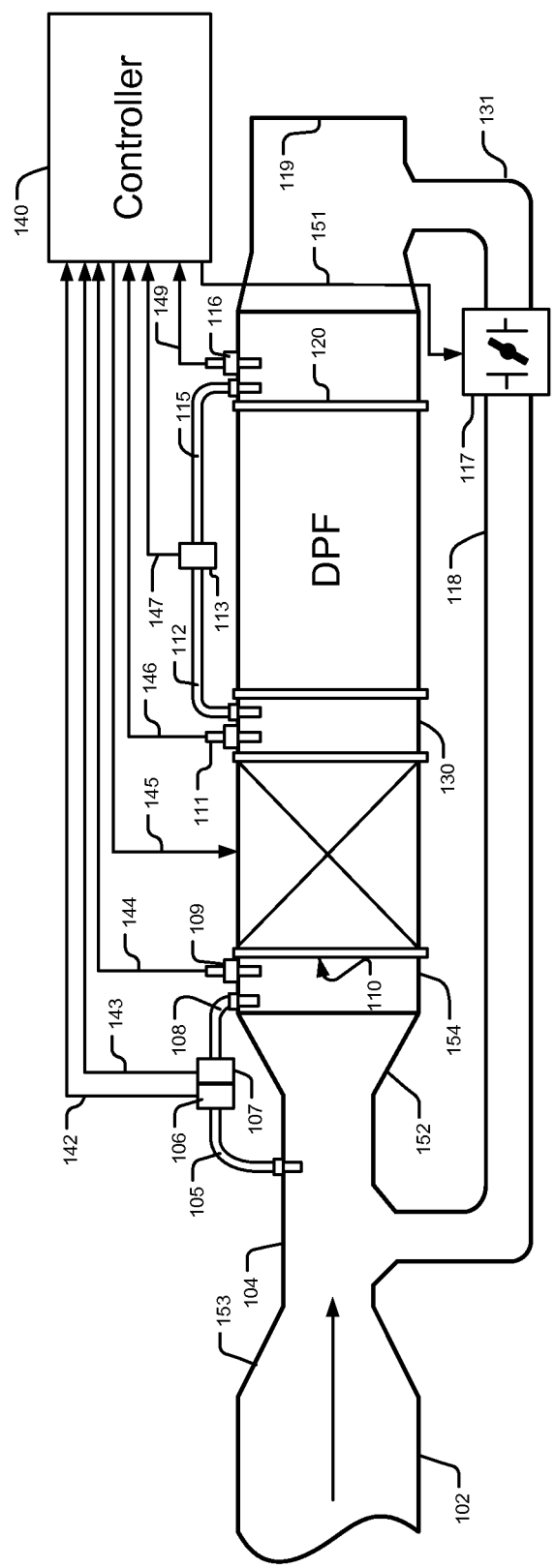
FIG. 5a is a schematic representation of an exhaust gas processing system of an internal combustion engine including an exhaust gas passage device, a heating device positioned downstream from the exhaust gas passage device, a diesel particulate filter, and a flow-back passage.

In the system of FIG. 1, the Venturi structure can also be used for increasing exhaust flow in regenerating the DPF 120. Referring to FIG. 5a, a connection pipe 118 is fluidly connected to the exhaust passage 104 and a control valve 117, which is also fluidly connected to the tailpipe 119 through another connection pipe 131. The control valve 117 is controlled by the controller 140 through signal lines 151, and the exhaust gas flow in the connection pipes 118 and 131 is controlled by energizing and de-energizing the control valve 117. In a DPF regeneration process, when the calculated exhaust flow rate $m_f$ is low, the control valve 117 is energized open. Under a pressure in between the tailpipe 119 and the exhaust passage 104, exhaust gas flows back to the exhaust passage 104, resulting in a higher exhaust flow rate passing through the heating device 110 and the DPF 120. High exhaust flow rate brings more heat energy to the DPF, thereby PM mal-distribution is reduced, and the limit of exhaust flow rate can be lowered to allow more regeneration chances. Furthermore, higher exhaust flow rate also decreases system response time in temperature control, resulting in better control performance.

Figure 5B:
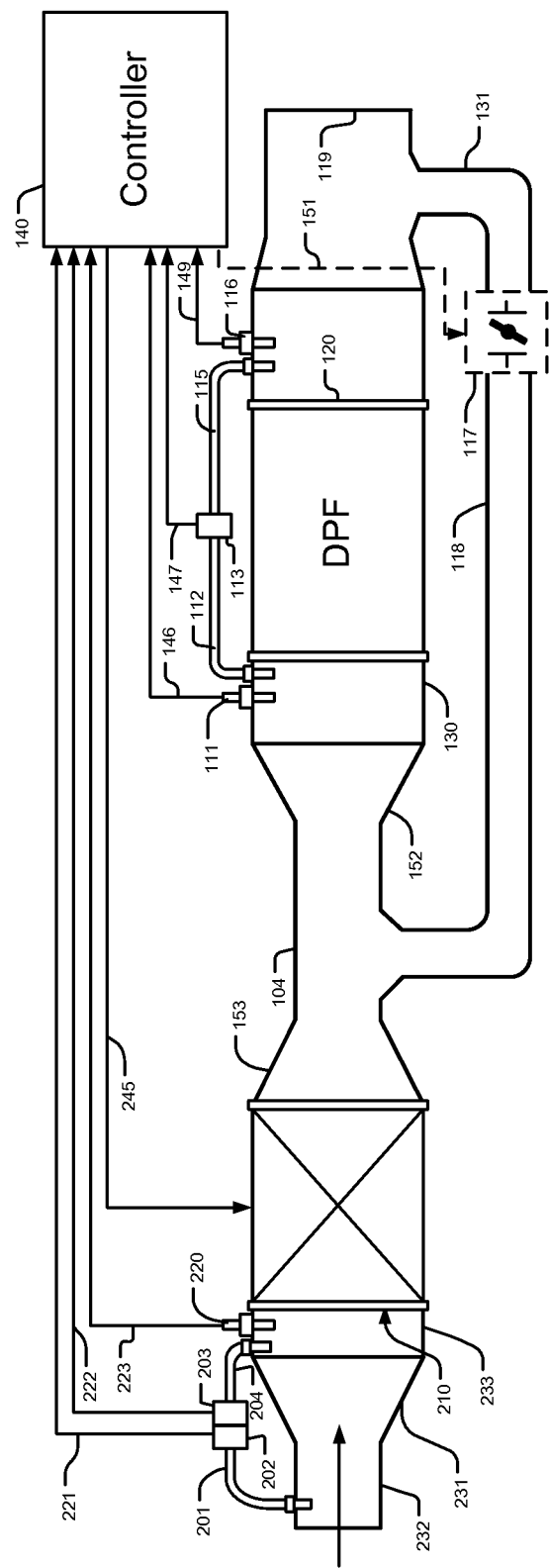
FIG. 5b is a schematic representation of an exhaust gas processing system of an internal combustion engine including an exhaust gas passage device, a heating device positioned upstream from the exhaust gas passage device, a diesel particulate filter, and a flow-back passage.

High exhaust flow rate in the system of FIG. 5a also decreases resident time of exhaust flow in the heating device 110. If a DOC is used in the heating device 110, low resident time may lower HC conversion efficiency. In the system of FIG. 5a, low HC conversion efficiency can be avoided by de-energizing the control valve 117 when the exhaust flow rate $m_f$ is too high. Another way to avoid low HC conversion efficiency is positioning the heating device 110 upstream from the Venturi structure. Referring to FIG. 5b, in such as system, a heating device 210 is fluidly connected to the cone transition 153 upstream from the exhaust passage 104. Upstream from the heating device 210 is a connection pipe 233, on which a temperature sensor 220 and a pressure sensing probe 204 are mounted. The connection pipe 233 is fluidly connected to an exhaust passage 232 with a smaller diameter through a cone transition 231, and another pressure sensing probe 201 is mounted on the exhaust passage 232. The pressure sensing probes 201 and 204 are fluidly connected to a differential pressure sensor 202, which is in communication with the controller 140 through signal lines 221, while a pressure sensor 203, which communicates to the controller 140 through signals lines 222, is fluidly connected to the pressure sensing probe 204. The temperature sensor 220 is electrically connected to the controller 140 through signal lines 223, and the heating device 210 is controlled by the controller 140 through signal lines 245. In this system, since high exhaust flow rate in the DPF 120 does not affect resident time in the heater 210, the control valve 117 is not required to shut off the exhaust flow-back path at high exhaust flow rates.

Figure 5C:
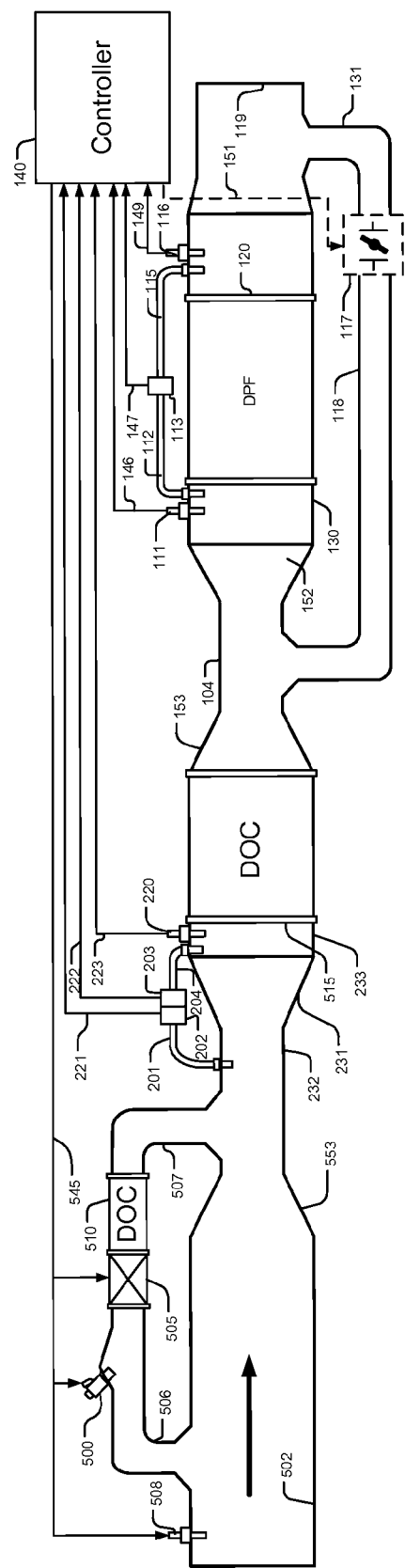
FIG. 5c is a schematic representation of an exhaust gas processing system of an internal combustion engine including an exhaust gas passage device, a two-stage bootstrapping heating device, a diesel particulate filter, and a flow-back passage.

Referring to FIG. 3 and FIG. 5b, the heating device in the system of FIG. 3 and the flow back device in the system of FIG. 5b can be used together for increasing regeneration performance with low temperature and low flow rate exhaust gas, which is normally generated by an engine operated at low torque modes, such as in idling. Referring to FIG. 5c, in such as system, a main DOC 515 is positioned in between the temperature sensors 220 and the cone transition 153, and a connection pipe 507 fluidly connects the exhaust passage 232 to a front DOC 510, which has an electrical heater 505 positioned upstream. The exhaust passage 232 is fluidly connected to an exhaust passage 502, which has a larger diameter, and the electrical heater 505 is fluidly connected to the exhaust passage 502 through a connection pipe 506, which has a fuel injector 500 mounted. Upstream from the connection pipe 506, a temperature sensor 508 is mounted on the exhaust passage 502, while the temperature sensor 508, the injector 500, and the electrical heater 505 are in communication with the controller 140 through signal lines 545. A control scheme of FIG. 4b and a control algorithm of FIG. 4a can be used for controlling the electrical heater 505 and the fuel injector 500.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

The invention claimed is:

1. An exhaust gas processing system of an internal combustion engine, comprising:
   a diesel particulate filter;
   an exhaust gas passage device positioned upstream from said diesel particulate filter including a first high pressure passage, a second high pressure passage fluidly connected to said diesel particulate filter, and a low pressure passage, wherein both of said first high pressure passage and said second high pressure passage have a larger cross-section area than said low pressure passage;
   a fuel injector in communication to said first high pressure passage for releasing a dosing fuel in regenerating said diesel particulate filter;
   a heating device fluidly connected to said first high pressure exhaust passage receiving a mixture of said dosing fuel and an exhaust gas flow;
   a first diesel oxidation catalyst positioned downstream from said heating device fluidly connected to said low pressure exhaust passage;
   a second diesel oxidation catalyst positioned in between said exhaust gas passage device and said diesel particulate filter; and
   a regeneration controller configured to control a power applied to said heating device and a flow rate of said dosing fuel in regenerating said diesel particulate filter.

2. The exhaust gas processing system of claim 1, wherein said heating device is an electrical heater.

3. The exhaust gas processing system of claim 1, wherein said regeneration controller is further configured to energize said heating device when a temperature in said second diesel oxidation catalyst is lower than a predetermined value.

4. The exhaust gas processing system of claim 3, wherein said regeneration controller is further configured to set said flow rate of said dosing fuel to a first level when said heating device is energized and to a second level when said temperature in said second diesel oxidation catalyst is above a light-off temperature thereof.

5. The exhaust gas processing system of claim 1, further comprising:
   a pressure sensor and a first temperature sensor for measuring a pressure and a temperature in said second high pressure passage respectively; and
   a first differential pressure sensor for measuring a pressure difference in between said second high pressure passage and said low pressure passage.

6. The exhaust gas processing system of claim 5, wherein said regeneration controller is further configured to control said power applied to said heating device and said flow rate of said dosing fuel in response to sensing values obtained from said first differential pressure sensor, said pressure sensor, and said first temperature sensor.

7. The exhaust gas processing system of claim 5, further comprising:
   a second temperature sensor positioned upstream from said exhaust gas passage device for measuring a temperature in said first high pressure passage; and a third temperature sensor positioned downstream from said second diesel oxidation catalyst for measure a temperature therein.

8. The exhaust gas processing system of claim 7, wherein said regeneration controller is further configured to control said power applied to said heating device and said flow rate of said dosing fuel in response to sensing values obtained from said first differential pressure sensor, said pressure sensor, said first temperature sensor, said second temperature sensor, and said third temperature sensor.

9. The exhaust gas processing system of claim 5, further comprising:
a second differential pressure sensor for measuring a pressure drop across said diesel particulate filter.

10. The exhaust gas processing system of claim 9, wherein said regeneration controller is further configured to trigger a regeneration process for said diesel particulate filter in response to sensing values obtained from said first differential pressure sensor, said second differential pressure sensor, said pressure sensor, and said first temperature sensor.

11. The exhaust gas processing system of claim 10, wherein said regeneration controller is further configured to calculate a particulate amount value indicative of an amount of particulate matter deposited in said diesel particulate filter according to a ratio between sensing values obtained from said second differential pressure sensor and said first differential pressure sensor, and trigger said regeneration process in response to said particulate amount value.

* * * * *